(12) United States Patent
Singhal et al.

(10) Patent No.: US 7,463,595 B1
(45) Date of Patent: Dec. 9, 2008

(54) OPTIMIZATION METHODS AND SYSTEMS FOR A NETWORKED CONFIGURATION

(75) Inventors: Prafull Singhal, San Jose, CA (US); Francesco R. Dimambro, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 828 days.

(21) Appl. No.: 10/880,938

(22) Filed: Jun. 29, 2004

(51) Int. Cl.
  *H04L 12/28* (2006.01)
  *G06F 15/177* (2006.01)
  *G06F 15/173* (2006.01)
  *G06F 15/16* (2006.01)

(52) U.S. Cl. .................. 370/254; 709/221; 709/226; 709/228

(58) Field of Classification Search .......... 370/254; 709/220–228
See application file for complete search history.

(56) References Cited

U.S. PATENT DOCUMENTS 7,051,087 B1 * 5/2006 Bahl et al. .................. 709/220
2003/0200368 A1 * 10/2003 Musumeci .................. 710/260

* cited by examiner

*Primary Examiner*—Ronald Abelson
(74) *Attorney, Agent, or Firm*—Martine Penilla & Gencarella, LLP

(57) ABSTRACT

A configuration state of a networked system is automatically adjusted to achieve optimal performance. The networked system is defined by a plurality of data exchange entities having one or more tunable parameters. Networked system performance is monitored and performance metrics are stored to a database. The performance metrics are analyzed along with network and system rules and constraints, and the particular configuration of the networked system. The tunable parameters are automatically adjusted to achieve optimal networked system performance.

18 Claims, 5 Drawing Sheets

OPTIMIZATION METHODS AND SYSTEMS FOR A NETWORKED CONFIGURATION

BACKGROUND

The present invention relates generally to computer networks and network systems, and more specifically to the optimization of network hardware, software, and firmware configurations, driver initialization, settings, and related parameters of a networked configuration.

The Network Interface Card (NIC), and the plurality of network configurations and settings have become increasingly complex as the individual systems and networks in which NICs are deployed have likewise become increasingly complex. As a result, an increasing plurality of parameters require initialization, setting, and adjustment to achieve and maintain optimum network performance.

Currently, NIC hardware, drivers, and to some extent network systems, are set to default values determined to be optimal for "standard" or "typical" configurations, and deployed accordingly. Individual systems and networks, however, often differ from the "typical" model. Due to individual usage patterns and platform and system configurations, the default settings for the NIC, drivers, etc., may not be optimal in actual implementation. Parameter adjustment and tuning may require significant skill and knowledge in such areas as hardware, software, protocols, etc. Employment of the necessary knowledge and skill can be costly in terms of technical support to achieve and maintain optimal system and network performance, and costly in terms of customer satisfaction with manufacturers and suppliers of individual and system platforms and components.

In view of the foregoing, what is needed are systems, apparatus, and methods for the automatic optimization of network components and network related processes in response to actual platform and system configuration, usage patterns, dynamic network conditions, and related system and platform environment parameters.

SUMMARY

Broadly speaking, the present invention fills these needs by providing systems, apparatus, and methods for the automatic optimization of network components and network related processes in response to actual platform and system configuration, usage patterns, dynamic network conditions, and related system and platform environment parameters. The present invention can be implemented in numerous ways, including as a process, an apparatus, a system, a device, a method, or a computer readable media. Several embodiments of the present invention are described below.

In one embodiment, a method for adjusting a configuration state for a networked system is provided. The method includes enabling networking communication for the networked system. The networked system is defined by a plurality of data exchange entities (DEEs), and each DEE is capable of having a parameter setting. The plurality of DEEs are interpretative to enable the networked system to communicate over a network. The method further provides for monitoring each of the DEEs during communication over the network, and for storing performance metrics of each of the DEEs in a database in response to the monitoring of each of the DEEs. Next, the method includes analyzing the stored performance metrics stored in the database. The analyzing uses rules and constraints to determine possible adjustments to the parameter setting of each of the DEEs. The method then provides for applying an adjustment to the parameter setting of at least one of the DEEs. The adjustment is configured to define an adjusted configuration state for the networked system.

In another embodiment, a method of optimizing a configuration of a networked system is provided. The method includes monitoring a performance of the networked system. The networked system is a computer system defined by a plurality of data exchange entities (DEEs) and attached to a network. Each one of the plurality of DEEs has one or more tunable parameters. The tunable parameters define data exchange operations of the networked system. The method further includes analyzing performance metrics of each of the DEEs. The performance metrics are obtained from the monitoring of the performance of the networked system. The performance metrics of each of the DEEs are stored in a database. The method then provides for applying an adjustment to one or more tunable parameters of one or more of the plurality of DEEs.

In yet another embodiment, a method for optimizing a configuration state for a computing environment is provided. The method includes monitoring a performance of the computing environment. The computing environment is defined by a plurality of data exchange entities (DEEs), with each one of the plurality of DEEs having one or more tunable parameters. The one or more tunable parameters define data exchange operations within the computing environment. The method further includes storing performance metrics of each one of the plurality of DEEs to a database, and evaluating the stored performance metrics. The evaluating includes a consideration of rules and constraints for the computing environment. Finally, the method provides for applying an adjustment to the one or more tunable parameters. The adjustment is applied to define an adjusted configuration state for the computing environment. The computing environment is defined to include means for automatically optimizing the configuration state.

Other aspects of the present invention will become apparent from the following detailed description, taken in conjunction with the accompanying drawings, illustrating by way of example the principles of the invention.

BRIEF DESCRIPTION OF THE DRAWINGS

The accompanying drawings, which are incorporated in and constitute part of this specification, illustrate exemplary embodiments of the invention and together with the description serve to explain the principles of the invention.

DETAILED DESCRIPTION

An invention for a self-optimizing network configuration and the automatic optimization of network data exchange entities is described. Embodiments of the present invention include methods and systems for automatically adjusting one or more network configuration parameters to achieve optimal configuration of a networked system. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

The Network Environment, Parameters, Inputs

Embodiments of the present invention are generally implemented in a networked environment. In general, a networked environment includes two or more participating stations or systems, capable of exchanging data with one another, and sharing a common connection of sufficient capacity to carry any desired amount of data to be exchanged or shared. A networked environment includes both hardware and software aspects, firmware aspects, and a plurality of parameters of both hardware and software components that are capable of being tuned, also referred to as being "tunable," to optimize a reliable, fast, and efficient network. The following paragraphs provide an overview of selected parameters and components of the network environment.

A network may be described as having a plurality of Data Exchange Entities (DEEs) that define the network, its capacity, its capability, its performance, etc. DEEs may also be described as network or system parameters in that DEEs provide a measure of performance, capacity, capability, dynamic network conditions, etc. of the network and system. Several DEEs are described in the following paragraphs, including contributions to and impact upon a network.

Figure 1:
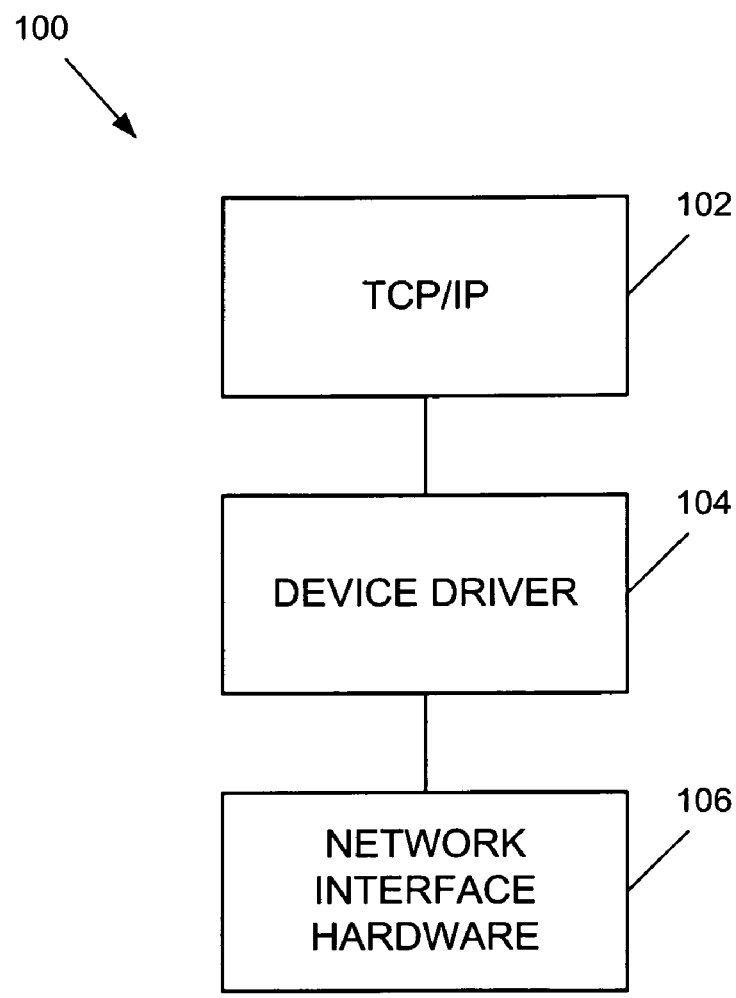
FIG. 1 shows and exemplary network stack having a TCP/IP level, a Device Driver level, and a Network Interface Hardware level.

In a networked environment, a "network stack" is typically defined to enable data exchange, and the network stack incorporates both hardware and software. A typical network stack includes a TCP/IP level, a device driver level, and a network interface level. These levels are illustrated in FIG. 1 with the exemplary network stack 100 having a TCP/IP level 102, a Device Driver level 104, and a Network Interface Hardware level 106. Each of the levels, also called layers, is generally discussed herein in reference to specific network parameters as well as in reference to specific features of embodiments of the present invention, but briefly, the TCP/IP level 102 includes the protocols for the exchange of network traffic. The device driver level 104 includes network device drivers, and of particular relevance to embodiments of the present invention, the device driver level is where the transmit descriptor and the receive descriptor rings are located. The network interface hardware level 106 includes a network interface card (NIC), and includes two layers known as the Media Access Control (MAC) and the physical medium (PHY). The MAC and the PHY, as is known, are defined in the international specification IEEE 802.3. In general, the MAC is configurable according to the particular local system in which it is deployed. The PHY includes a plurality of configurables which, in application, maintain the state of the link or network connection. It is the PHY that physically connects the local device to the wider world of the network over a plurality of specified (i.e., IEEE 802.3) wire sizes and types. Additionally, the "state" of a network is generally characterized by such measurable parameters as half duplex or full duplex mode of the link or network connection, number and type of participating stations or systems, network and participating station system software, and a plurality of additional software and hardware characteristics, applications, configurations, etc.

One implementation of the device driver layer 104 includes the descriptor rings. Descriptor rings include transmission (Tx) descriptor rings and receive (Rx) descriptor rings. Typically, there are one or more Tx descriptor rings and one or more Rx descriptor rings with the number and size of the Tx and Rx descriptor rings defined at initialization. Descriptor rings are resource dependent, and therefore as the dynamic networked environment demands more and more of these fixed descriptor rings, network performance can be degraded. An interface is defined between the MAC and the device driver layer 104 for staging data packets for transmission.

Looking at the Tx descriptor ring, in Sun™ systems, in addition to size and number, there are multiple dimensions of configurability. Of particular relevance to embodiments of the present invention, threshold values related to the size of network data packets determine the manner in which data packets are processed in relation to the Tx and Rx descriptor rings. Common default values serve as an appropriate reference point in describing the threshold values. For data packets that are less than 256 bytes, it is generally accepted as most efficient to copy the packets into a pre-mapped buffer, and then instruct the hardware to fetch the packet from the buffer. Typically, "bcopy" interface is used to copy the packets into the pre-defined buffer. For packets that are greater than 256 bytes, and less than one kilobyte, "ddi_dma" interface is used, and for packets greater than one kilobyte, "dvma" interface is used. Again, the listed values are typical default values and it should be appreciated that the most efficient threshold values for packet sizes may change from system to system, and from application to application running on the varying systems.

A descriptor ring is essentially memory. Descriptors are arranged circularly on the descriptor ring, giving the structure it's name "ring." Descriptors are generally pointers to the data packets located in system memory, and not the actual data packets. The device driver adds the descriptors to the Tx descriptor ring. After the system hardware transmits the actual packet, the descriptor is updated to indicate the status of the transmission. After a successful transmission, the descriptor can be over-written with another descriptor.

The MAC "fetches" a descriptor which provides the path or points to a corresponding packet in system memory. The corresponding packet is then fetched by MAC, transmitted, and then MAC updates the Tx descriptor on the descriptor ring with the transmit status. As is known, data packets are of different sizes. The descriptor further defines location and size of a packet.

In a TCP/IP network, data packets in general pass through the TCP/IP level 102 of the network stack 100. A data structure is then passed to the device driver level 104 from the TCP/IP level 102. The device driver level 104 must then generate a pointer that can be understood by the CPU/hardware. The pointer identifies an address to the data packet. The data packet itself does not pass to device driver level 104. The process for generating the new pointer, i.e., the pointer that can be understood and processed by the CPU/hardware, is one of bcopy, ddi_dma, and dvma. In generating the pointer, the size of the data packet, in addition to the location, is now known in the device driver level 104.

Ddi_dma and dvma mappings are expensive in terms of their associated processing overhead. It is therefore desirable, under certain conditions and scenarios such as in the case of small packet transfer, to more effectively employ bcopy mapping. Bcopy, as described above, is often most desirable as a new pointer is not actually generated. Because bcopy utilizes a pre-defined buffer, a pointer to the pre-defined buffer is generated only once, and simply used any time bcopy is appropriate according to packet size. When the device driver is initialized, a buffer is defined therein. The buffer so defined is reserved for packet and initialization data. A portion of the buffer is dedicated to bcopy data, and can typically accommodate data less than 256 bytes in size. Bcopy, then, simply utilizes a pre-defined pointer to a temporary buffer reserved for data packets typically smaller than 256 bytes. Ddi_dma and dvma are mapping procedures with an overhead in system resources and processing time. Bcopy does involve a copy process from system memory to system memory (the destination system memory being the pre-allocated location for bcopy data) with an indexed pointer already generated for the location. Ddi_dma and dvma does not copy the packet data, but maps the location in system memory and then generates the pointer to that location which can be read and used by the CPU/hardware. The threshold values, as described above, for efficient utilization of system resources can vary significantly from system to system, and within systems as network traffic volume and other state conditions of a network change.

Figure 2:
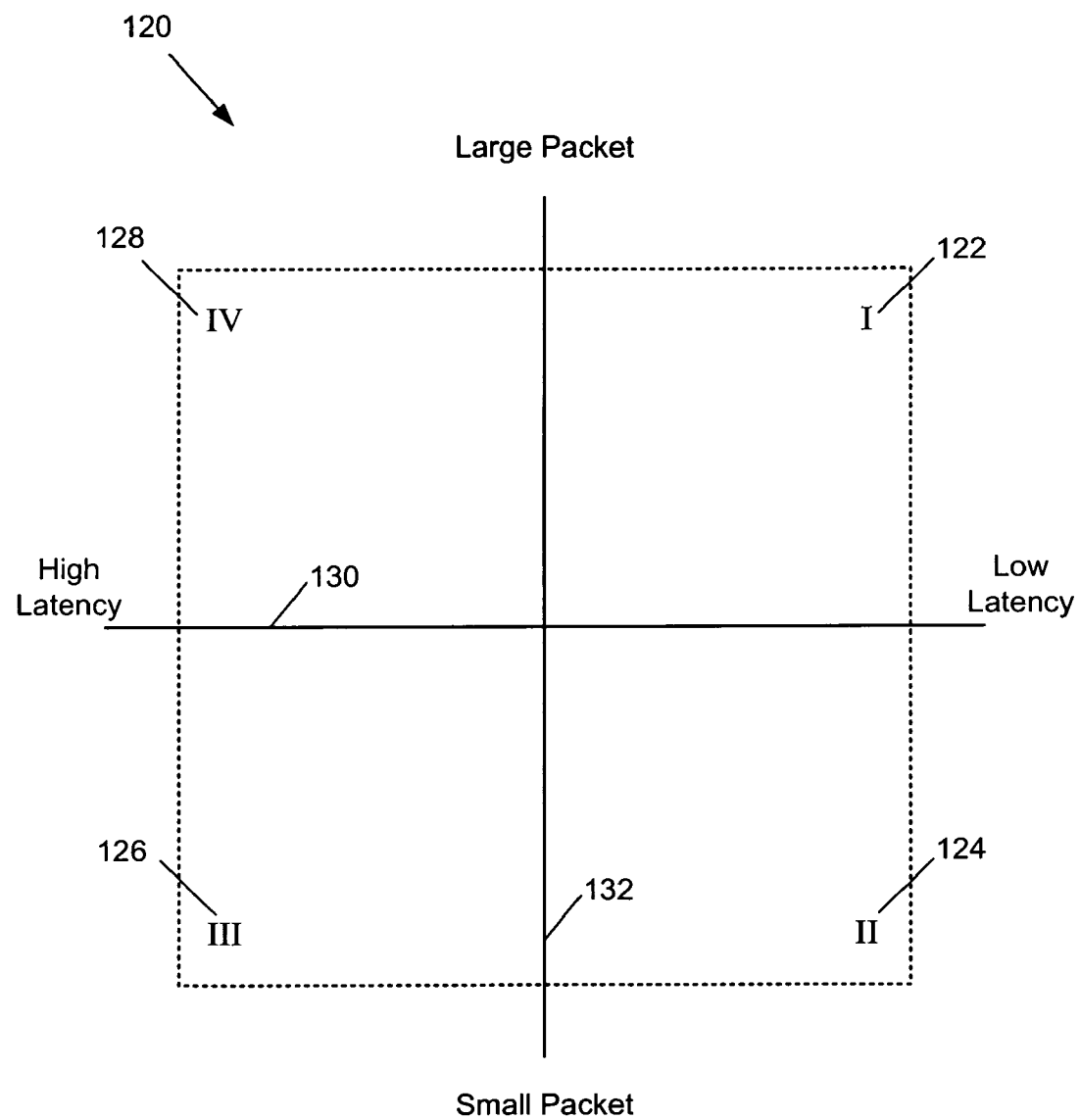
FIG. 2 is a grid showing a two dimensional application analysis based on the type of network traffic generated.

One variable or dimension having significant impact on system performance, and often of significant importance in tunable parameter evaluation, is the application(s) running. One manner of evaluating an application and its impact is by considering the type of network traffic the application generates or causes to be generated. That is, while the type of application may be of minimal importance, the type of network traffic it generates is of paramount importance. FIG. 2 is a grid 120 showing a two dimensional application analysis based on the type of network traffic generated. Evaluated parameters are along a latency axis 130 and a packet size axis 132, and range from large packets to small packets, and from high latency to low latency. The perpendicularly intersecting axes 130, 132, create a field for the application analysis, defining four quadrants: quadrant I 122 defined by large packets/low latency; quadrant II 124 defined by small packets/low latency; quadrant III 126 defined by high latency/small packets; and quadrant IV 128 defined by high latency/large packets. Examples of applications falling into each of the quadrants include for quadrant I 122, HTTP traffic, for quadrant II 124, HTTP traffic, and Oracle™ database (DB) transactions, for quadrant III 126, video stream, and for quadrant IV 128, backups. The cited examples are intended to be exemplary and not limiting or exclusive.

In one embodiment of the invention, the type of packets or network traffic that an application generates, and a specific system configuration, are significant considerations used to define which of the plurality of tunable parameters require adjustment, the appropriate adjustment to be made, and a priority for adjustment.

Turning back to the consideration of Tx descriptor rings, with newer generation of silicon, there will be more than one Tx descriptor ring in a system. In general, with multiple CPU's, only one CPU can manipulate a descriptor ring at any one time. In one configuration, there are four Tx descriptor rings with one Tx descriptor ring for each of four CPUs. This configuration illustrates transmit load balancing. Transmit load balancing is managed by MAC. In order to ensure proper packet sequencing, one Tx descriptor ring is typically assigned to a TCP connection. However, as described above, the configuration is affected by both the application and the system. The system is limited by the number of CPU's configured. If only two CPU's are configured to a particular system, then only two Tx descriptor rings can be potentially supported by that system. The application is limited by the number of connections it is able to support. In a typical HTTP application for example, multiple connections are supported, and therefore multiple Tx descriptor rings can be defined. However, some applications do not support multiple connections, such as backups or video streaming for example, and due to packet sequencing concerns, a single Tx descriptor ring is defined.

Another tunable parameter controls the manner in which space is reclaimed on the descriptor ring. There can be advantages to reclaiming descriptor space in batches as opposed to a one-for-one reclaiming as packets are transmitted. However, descriptor space is limited by the number of, for example, Tx descriptor rings and the size of the Tx descriptor rings. Additionally, the CPU cycle, and both packet size and application latency impact the discretion regarding when and how much descriptor space is reclaimed.

System problems develop due to improperly tuned parameters such as those already identified above. For example, in an environment with a high volume of data and a limited number or size of Tx descriptor rings, packets can get delayed due to Tx packet queuing behind the Tx descriptor ring when the descriptor ring gets full. There are diagnostics that can identify how many times packets have been queued, but such diagnostics are typically beyond the technical expertise of an average customer, and at times require rather specialized skill or training.

On the Rx side, load balancing is also a factor, and a tunable parameter. In Rx descriptor management, there is hardware load balancing and software load balancing. In hardware load balancing, the MAC is designed to accommodate multiple Rx descriptor rings. When a packet is received by the system, it is assigned a flow ID by the system. The flow ID is determined in the MAC by the source and destination TCP and IP addresses, also known as a five-tuple, which is then used to choose to which of the possibly multiple Rx descriptor rings the packet is assigned.

In a multiple CPU system, each Rx descriptor ring is assigned to a separate CPU. The maximum number of Rx descriptor rings is typically limited to four. When there are more than four CPU's configured to a system, excess CPU's don't usually participate in Rx functions. In such a system configuration, software load balancing is used to distribute the work within the system, and to maximize the benefits realized with multi-CPU processing. The one-to-one correspondence between CPU and Rx descriptor ring can be expanded because with software load balancing, a CPU offloads some of the data processing to a CPU that isn't participating in or have an associated Rx descriptor ring. Flow ID is used to choose the excess CPU to be utilized. Software load balancing can be enabled or disabled.

Considerations for enabling or disabling software load balancing are essentially the same as in Tx descriptor utilization, but there are some variations in the application impact, and whether the system is a client or server. By way of example, an application that doesn't support multiple connections on the client side, e.g. video streaming, may support multiple connections on the server side, which video streaming clearly does.

The receive side is tied to the transmission side in the Solaris™ TCP/IP protocol stack, and when a packet is received, there is a high probability that a packet is transmitted in the same thread of execution. Therefore, transmission time affects receive time. So, if receiving an acknowledgement signal, for example, reception of an acknowledgement of receipt of one packet may be required to transmit a subsequent packet. Further, while processing packets to transmit, the packets can "back up" while waiting for the previous receive thread to unwind back to receive the next packet. In order to reduce the probability that an Rx packet may be delayed by a Tx processing, a serialization queue can be implemented. A serialization queue will not hold up an Rx thread that has lead to a Tx happening, and such queuing works particularly well for Oracle™ DB applications. Serialization queuing allows all CPU's to be constantly doing useful work. Serialization queuing is particularly useful with a large number of connections, multiple CPU's, and small packets, but does come with a potential impact with respect to Tx packet latency. Representative applications that tend to be good candidates for serialization queuing are found in Quadrant II 124.

Another tunable parameter is known as Interrupt Blanking. In the MAC, an interrupt is issued when a descriptor is posted to a descriptor ring. Interrupt blanking enables batching or time out for Interrupts. That is, an interrupt would issue only after a preset or specified number of packets are posted to a descriptor ring, and/or after a specified time out. The preset or specified number, in one embodiment, is itself a tunable parameter. Interrupt blanking is particularly useful as it increases time for useful work. When interrupt blanking is implemented, it is typical to gain a benefit to the system in throughput, but it costs in latency (e.g., there is an increase in latency).

In the PHY, tunable parameters include full and half duplex modes for speed of data exchange. Autonegotiation typically checks and adjusts autonegotiation settings based on capabilities of both sending and receiving systems. Because autonegotiation has historically presented problems to effective implementation, autonegotiation is commonly not used, and the system(s) (sending and receiving) are manually configured. However, if the sending and receiving are not matched (e.g., both systems half duplex, or both systems full duplex) problems such as frame errors, missed packets, etc., are encountered.

Also in the PHY, the parameter of "flow control" is found. Flow control compensates for congestion caused when system processing slows due to, for example, low resources. The PHY includes a manual setting for flow control. Each PHY setting on individual station platforms impacts overall network efficiency. It should be noted that, if network traffic is "sustained," an indication of low resources of an individual system would be a systemic problem that would not be alleviated by adjustment of flow control. However, in "normal" network traffic, described as "bursty," adjustment of flow control can positively impact system performance and network efficiency.

Figure 3:
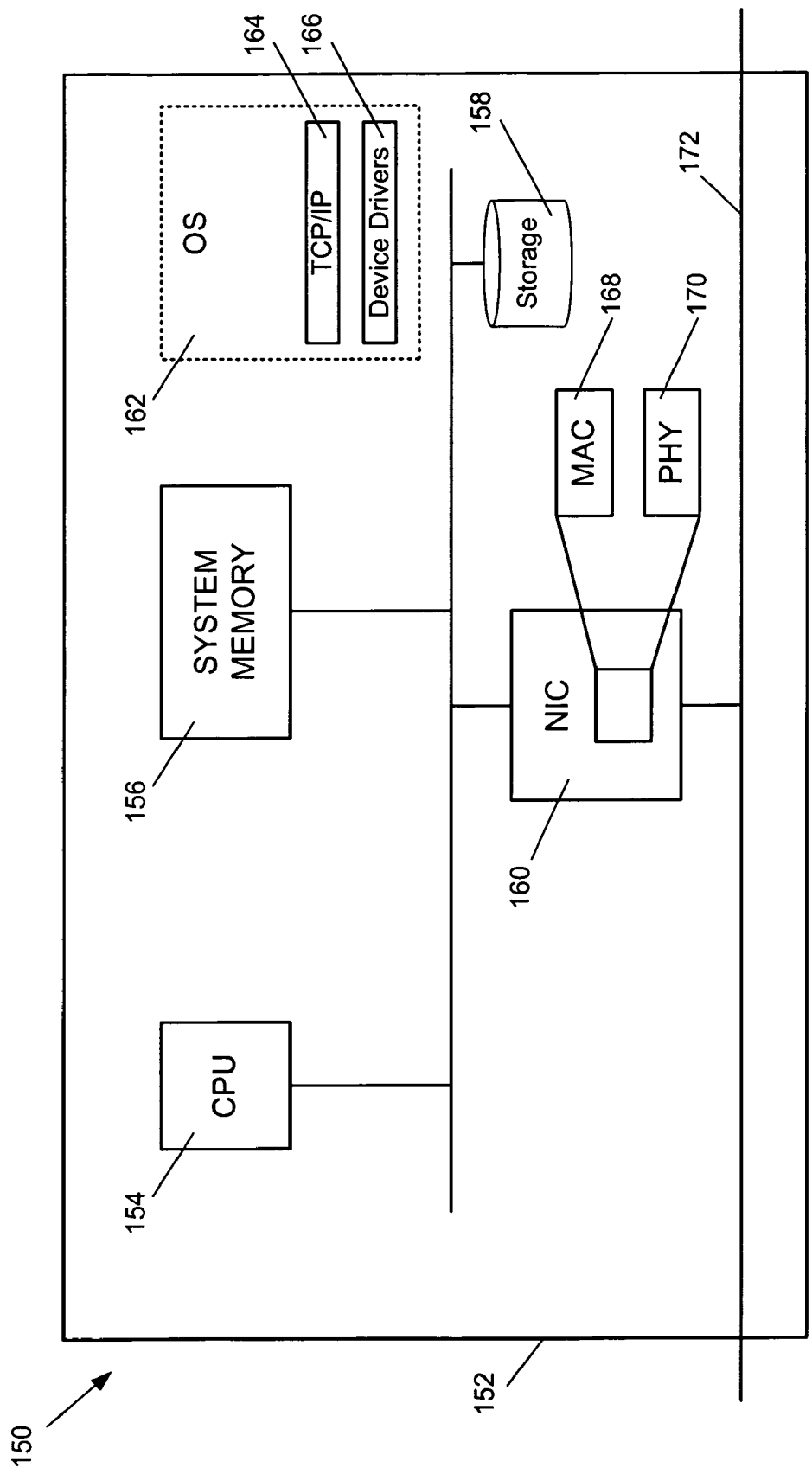
FIG. 3 is a system schematic of a networked system.

FIG. 3 is a system schematic 150 of a networked system as described above. A networked system is a local, self-contained system, that connects to the network to become part of the larger network. In FIG. 3, a boundary defines the networked system 152 contained within. The networked system 152 illustrated in FIG. 3 generally includes a central processing unit (CPU) 154, system memory 156, storage 158, and network interface card (NIC) 160. The operating system (OS) 162 generally operates and interacts with essentially the entirety of networked system 152. TCP/IP 164 and device drivers 166 and are broadly implemented by OS 162, and are therefore illustrated as components of OS 162. NIC 160, contains the MAC 168 and the PHY 170. The local system connects to the network over the physical network wire 172 to become a networked system.

The Self-Optimizing Network

As described above, a network may be described as having a plurality of DEEs that define the network, its capacity, its capability, its performance, etc. Each DEE is capable of having one or more parameters, the one or more parameters are each capable of a setting or adjustment, and the collective plurality of DEEs are interpretive to enable a state of network functionality. Therefore, when the DEEs and their respective parameters are correctly set or adjusted, also referred to as being tuned, the network state is tuned for optimum performance. If, however, the DEEs and their respective parameters are improperly set or adjusted, i.e., out of tune, then network performance is degraded or non-functional. The following table summarizes some of the DEEs and tunable parameters in a network, and related inputs to consider to achieve an optimum state of adjustment.

TABLE 1

| Tunable Parameters | Inputs |
| --- | --- |
| Tx Parameters | Statistical Information |
| Rx Parameters | driver statistical information |
| MAC Parameters | CPU statistical information |
| PHY Parameters | memory statistical information |
| System Parameters | System Capabilities |
|  | Application Types |
|  | User Inputs |

As illustrated in Table 1, inputs upon which values and selections for tunable parameters are based include such statistical information as driver statistics which document benefits realized from hardware load balancing and from software load balancing, CPU statistics which document a percentage of time a CPU is functioning or "up," and how much a CPU is being utilized, and memory statistics documenting an amount of available and free memory, and paging statistics.

Statistical information can provide a measure of the dynamics of specific configuration and network environment which illustrate the inadequacies of the "one size fits all" of default parameter settings. In accordance with embodiments of the present invention, optimization of network components and processes is automatically achieved by measuring or evaluating a local system of a particular configuration in a particular environment, and automatically enabling the intelligence required to perform optimization tuning processes. Table 2 illustrates some exemplary statistical information captured and evaluated in embodiments of the present invention. Table 2 should be considered to be exemplary only, and not exhaustive or exclusive of the plurality of statistical measurements collected and evaluated in accordance with embodiments of the present invention.

TABLE 2

| Statistical Measurement | Description |
| --- | --- |
| rx_ov_flow | Number of times the hardware is unable to receive a packet due to the internal FIFOs being full. |
| rx_no_buf | Number of times the hardware is unable to receive a packet due to Rx buffers being unavailable. |
| rx_no_comp_wb | Number of times the hardware is unable to receive a packet due to no space in the completion ring to post Received packet descriptor. |
| ipackets_cpuXX | Number of packets being directed to load-balancing thread XX. |
| mdt_pkts | Number of packets sent using multidata interface. |
| rx_hdr_pkts | Number of packets arriving which are less than 252 bytes in length. |
| rx_mtu_pkts | Number of packets arriving which are greater than 252 bytes in length. |
| rx_jumbo_pkts | Number of packets arriving which are greater than 1522 bytes in length. |

TABLE 2-continued

| Statistical Measurement | Description |
|---|---|
| rx_ov_flow | Number of times a packet is simply dropped by the driver because the module above the driver cannot accept the packet. |
| rx_nocanput | Number of times a packet is simply dropped by the driver because the module above the driver cannot accept the packet. |
| rx_pkts_dropped | Number of packets dropped due to Service FIFO queue being full. |
| tx_hdr_pkts | Number of packets hitting the small packet transmission method, copy packet into a pre-mapped DMA buffer. |
| tx_ddi_pkts | Number of packets hitting the mid range DDI DMA transmission method. |
| tx_dvma_pkts | Number of packets hitting the top range DVMA fast path DMA transmission method. |
| tx_jumbo_pkts | Number of packets being sent which are greater than 1522 bytes in length. |
| tx_max_pend | Measure of the maximum number of packets which was ever queued on a Tx ring. |
| tx_no_desc | Number of times a packet transmit was attempted and Tx descriptor elements were not available. The packet is postponed until later. |
| tx_queueX | Number of packets transmitted on a particular queue. |
| mac_mtu | The maximum packet allowed past the MAC. |
| pci_bus_speed | The PCI bus speed that is driving the card. |

The System Capabilities (see Table 1) include the number of CPU's configured to a particular system, and other system resources. The application types reflect such considerations as illustrated and discussed in reference to FIG. 2 above, and the User Inputs include personal user experience with particular systems and configurations.

In order to achieve an optimally tuned local networked system in a dynamic networked environment, the plurality of DEEs and their respective plurality of tunable parameters require collective evaluation within the context of specific system configuration and the rules and constraints applicable to both individual as well as the collective plurality of network and system components. Table 3 is provided to illustrate some exemplary tunable parameters. Table 3 is exemplary only and should not be construed as exhaustive or exclusive of the plurality of tunable parameters.

TABLE 3

| Tunable Parameter | Description |
|---|---|
| XX_taskq_disable | This variable disables the use of Task queues and forces all packets to go up to layer 3 in the interrupt context. Possible values are 0 or 1. |
| XX_inst_taskqs | This value is only meaningful if 'XX_taskq_disable' is false and controls the number of taskq's setup per cassini device instance. Any value less than 64 is meaningful. Current default is 4. |
| XX_srv_fifo_depth | This value gives the size of the service fifo, in number of elements. This variable can be any integer value. |
| XX_cpu_threshold | This value gives the threshold for the number of CPU's which need to be present in the system and online before the Taskq's are utilized to Rx packets. |
| XX_start_cfg | This is an enumerated type it can have 2 values 0, and 1. When it's 0 the te Transmit algorithm doesn't do serialization, when it's one it does. |
| XX_put_cfg | This is an enumerated type and can have 3 values 0, and 1 and 2. When the value is 0 then the receive processing is all carried out in the interrupt context. When the value is 1 the processing happens as in the worker threads. When the value is 2 the processing happens in the streams service queues routine. |
| XX_reclaim_pending | This is the threshold for when reclaims start happening. Please keep it less than XX_tx_ring_size/3 Current default is 32. |
| XX_ring_size | This is the size of the Rx buffer ring, which is a ring of buffer descriptors for Rx. One buffer is 8k. This value MUST be modulo 2 and it's Max is 8K. Current Default is 128. |
| XX_comp_ring_size | This is the Rx completion ring size. There's one element per received packet. It also is modulo 2 and has a max of 8K. Current Default 512. Rule for setting this value: XX_comp_ring_size = XX_ring_size * 4. |
| XX_tx_ring_size | This value is the size if each Tx descriptor. It also is Modulo 2. The current value is 256. It's max is 8K. |
| XX_tx_ring_mask | This is a mask to control which Tx rings are used. It's possible values: 0 or 1 or 3. The default is 3. |
| XX_no_tx_lb | This variable disables the Tx load balancing and forces all transmission to be posted to a single descriptor ring. |
| XX_pci_latency | This is the PCI latency timer written to the PCI config space for the cassini device node. If the value is 0 then the defaults set by the PCI Nexus are accepted otherwise that value is overwritten by the value stored in this global. The default is 0xff |
| XX_br_pci_latency | This is the intel bridge PCI latency timer written to the bridges PCI config space. If this variable is non zero the Cassini device driver will steps up a device node and detect if an Intel bridge is present and replace the value with the one present in this global. The default is 0xff |
| XX_pci_cache_line | This is the PCI cache line written to the PCI config space for the cassini device node. If the value is 0 then the defaults set by the PCI Nexus are accepted otherwise that value is overwritten by the value stored in this global. The default is 0x0 |
| XX_br_pci_cache_line | This is the Intel bridge PCI cache line written to the bridges PCI config space. If this variable is non zero the Cassini device driver will steps up a device node and detect if an Intel bridge is present and replace the value with the one present in this global The default is 0x0 |
| XX_bcopy_thresh | The mblk size threshold used to decide when to copy a mblk into a pre-mapped buffer, or use DMA methods. The default is 256. |
| XX_dvma_thresh | The mblk size threshold used to decide when to use the fast path DVMA interface to Transmit mblk. The default is 1024 bytes. |
| XX_dma_stream_thresh | If the mblk size falls in the range greater than 256 bytes yet less than 1024 bytes then mblk fragment will be transmitted using ddi_dma methods. This global variable splits the ddi_dma mapping method further by providing Consistent mapping and Streaming mapping. It has been established that in the Tx |

TABLE 3-continued

| Tunable Parameter | Description |
| --- | --- |
|  | direction Streaming is better for larger transmissions then Consistent mappings. The default is 512. |
| XX_max_rx_pkts | The number of receive packets that can be processed in one interrupt before it must exit. The default is 512 |

Figure 4:
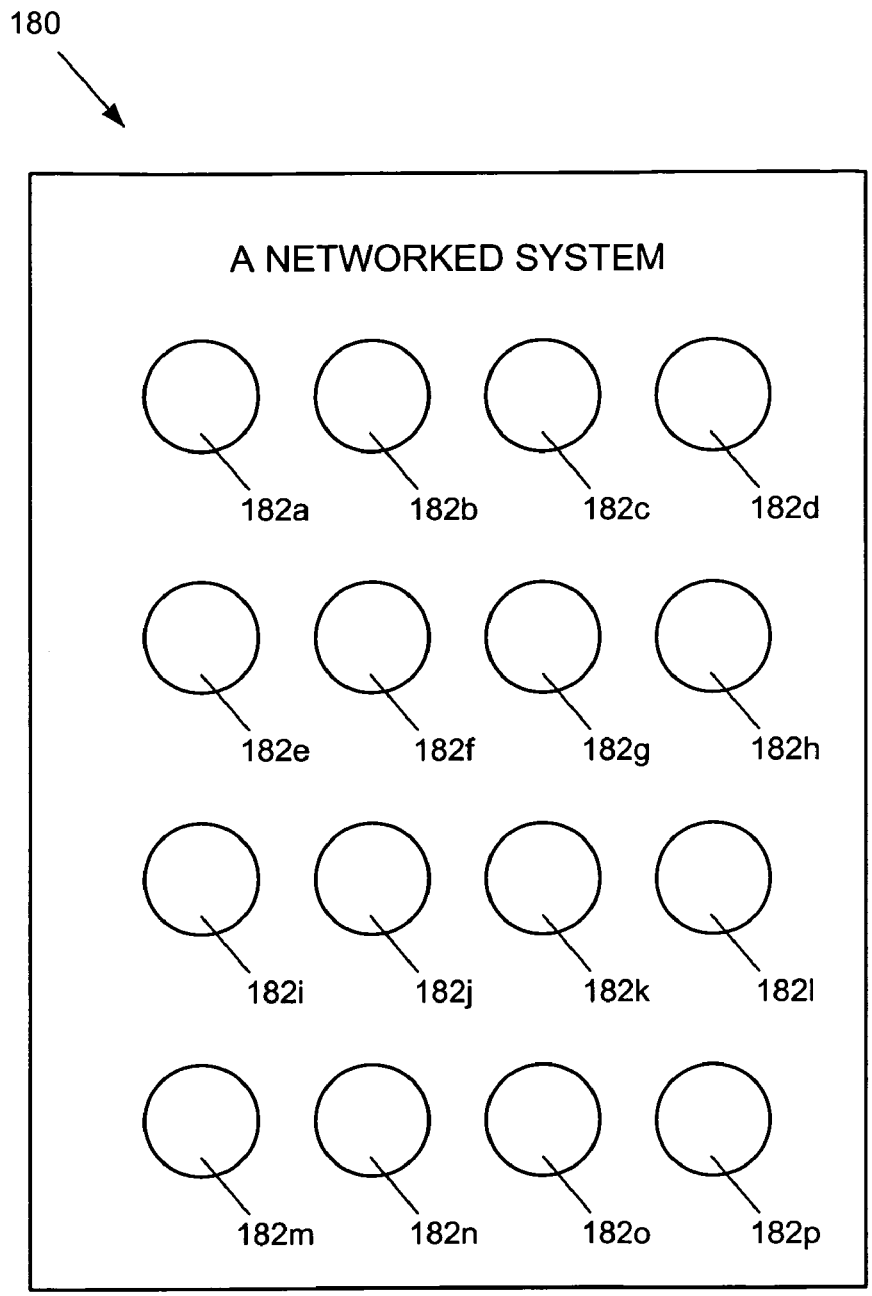
FIG. 4 is a graphical illustration of a networked system and representative DEEs defining the system in accordance with an embodiment of the invention.

FIG. 4 is a graphical illustration of a networked system 180 and representative DEEs 182 defining the system in accordance with an embodiment of the invention. As described above, representative DEEs 182 can include any of a plurality of items including drivers, processing elements, software, hardware, firmware, etc. In FIG. 4, for example, DEEs 182a-182d might represent four CPUs of the networked system 180, 182e might represent and Rx DEE, 182f might represent a Tx DEE, 182g might represent a network driver DEE, 182h might represent a MAC DEE, 182i might represent a PHY DEE, etc., for all of the DEEs that define the networked system 180.

In one embodiment of the present invention, the parameters of the DEEs are automatically adjusted and optimized in accordance with specific system and network inputs. One implementation is by use of an application. The application controls or directs the appropriate one or more DEEs. In one embodiment, the application receives inputs from the one or more DEEs, receives inputs from the system, and receives inputs from a user. Based on the inputs received, the application directs setting and/or adjustment of the one or more DEEs. By way of example, if the system were to run out of Tx descriptors, an alert known as "no tmd" is received which indicates that additional Tx descriptors are needed. The application would then analyze the DEE input "no tmd" in context with system capabilities, and the other inputs, and instruct the DEE accordingly. The instruction may or may not be to increase Tx descriptors, depending on the analysis of all available inputs. A resulting instruction may or may not be directed at the DEE having Tx descriptors among its tunable parameters. In the dynamic network environment, adjustment of another DEE may be the appropriate course of action to optimize the total environment in which the out of tune symptom is a deficit of Tx descriptors. In one embodiment, it is the plurality of DEEs that is interpretive of the networked state.

In one embodiment, there is an interface between the application and the plurality of DEEs such as an Input/Output Control (I/OCTL) interface to enable exchange of information between the application and a DEE, and to enable the application to command the setting, modification, adjustment, etc., of any parameter of any DEE. In one embodiment, there are rules and constraints in which the application must direct the one or more DEEs. By way of example, an application may detect that the network packets are being dropped because the hardware has run out of descriptors. However, rather than simply increase the number of descriptors, there may be a rule that requires a minimum level of system memory before the number of descriptors can be increased.

In one embodiment, there is a database (DB) of the historical statistical information that works in conjunction with the rules and constraints. The DB of the historical statistical information may include information specific to the particular system in which the DB resides, and may also include historical and statistical information about one or more specific networks. Table 2 above lists exemplary statistical information collected and evaluated, and the DB of historical statistical information is implemented, in one embodiment, to assimilate the information collected. In one example of how such information is utilized, historical and statistical information collected may provide insights into traffic profiles that can be used to optimize the network.

In another embodiment, an application receives inputs from the system, from one or more of the plurality of DEEs, from the user, and from a DB of status and actions, and all within the context of rules and constraints, and then the application provides prompts or alerts to a system administrator for corrective action. By way of example, the PHY flow control manual adjustments can be modified in response to a prompt or alert to a system administrator.

In another embodiment, the one or more DEEs can be made self-optimizing by using system threads in the device driver, instead of using a separate application. The device driver maintains data structures which are updated with statistical information about the state of the network and the state of the device. In one embodiment, the driver can implement one or more threads which can periodically check the statistics collected by the driver, and evaluate the statistics based on rules and constraints. The thread(s) can then optimize the tunable parameters and reconfigure the DEEs.

In another embodiment, one or more DEEs are self-calibrating. In one example, when a system initializes, a driver will adjust itself according to results of calibration testing at initialization. By way of example, a set number of sample packets are processed during system initialization, and based on actual performance of the system, thresholds for bcopy, ddi_dma, and dvma, are determined and configured.

Figure 5:
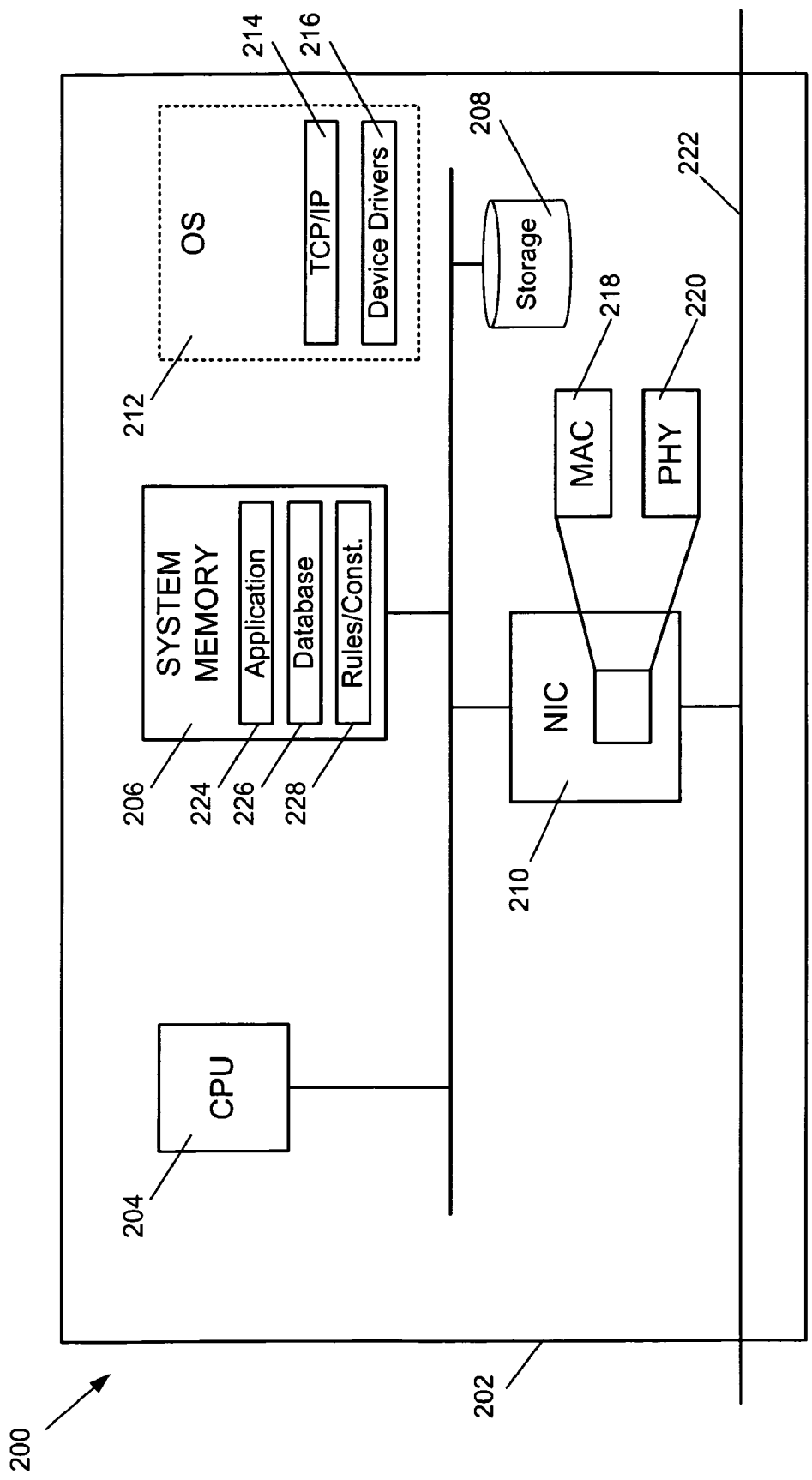
FIG. 5 is a system schematic as illustrated in FIG. 3 showing a networked system and incorporating implementations of the present invention.

FIG. 5 is a system schematic 200 as illustrated in FIG. 3 showing a networked system 202 and incorporating implementations of the present invention. The networked system 202 is a local, self-contained system, that connects to a network to become part of the larger network. In FIG. 5, a local boundary defines the networked system 202 contained within. The networked system 202 of FIG. 5 generally includes a central processing unit (CPU) 204, system memory 206, storage 208, and network interface card (NIC) 210. The operating system (OS) 212 generally operates and interacts with essentially the entirety of networked system 202. TCP/IP 214 and device drivers 216 and are broadly implemented by OS 212, and are therefore illustrated as components of OS 212. In the NIC 210, are the MAC 218 and the PHY 220. The local system connects to the network over the physical network wire 222 to become a networked system 202.

In one embodiment, an application 224 located in system memory 206 controls, directs, adjusts, modifies, etc., the appropriate one or more DEEs. In one embodiment, the application 224 receives inputs from the one or more DEEs, receives inputs from the system, and receives inputs from a user. Based on the inputs received, the application 224 directs setting and/or adjustment of the one or more DEEs. In another embodiment, an application 224 located in system memory 206 receives inputs from the system, from one or more of the plurality of DEEs, from the user, and from a database 226 of status and actions, and all within the context of rules and constraints 228, and then the application 224 provides prompts or alerts to a system administrator for corrective action. As shown in schematic 200, the application 224, the database 226, and the rules and constraints 228, reside in system memory 206. In other embodiments, the application 224, the database 226, and the rules and constraints 228 reside external to the local network system 202, i.e., external to the local boundary. By way of example, the application 224, the database 226, and the rules and constraints 228 might reside in a location accessible to and accessed by any system connected to or a part of a common network.

In summary, embodiments of the present invention provide for capturing the intelligence required to enable performance tuning operations. Exemplary tunable parameters of a local, networked system within a dynamic network environment have been described, as well as constraints upon those parameters, and various measurements and adjustments of the parameters. Embodiments of the present invention provide for the detection, measurement, and evaluation of a plurality of tunable parameters to enable automatic optimization of network components and network related processes within a dynamic network environment. Such automatic optimization dynamically tunes a local, networked system for maximum benefit in its given environment.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Embodiments of the present invention can be processed on a single computer, or using multiple computers or computer components which are interconnected. A computer, as used herein, shall include a standalone computer system having its own processor, its own memory, and its own storage, or a distributed computing system, which provides computer resources to a networked terminal. In some distributed computing systems, users of a computer system may actually be accessing component parts that are shared among a number of users. The users can therefore access a virtual computer over a network, which will appear to the user as a single computer customized and dedicated for a single user.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for adjusting a configuration state for a networked system, comprising:
    enabling networking communication for the networked system, the networked system being defined by a plurality of data exchange entities (DEEs), and each DEE capable of having a parameter setting, the plurality of DEEs being interpretative to enable the networked system to communicate over a network;
    monitoring each of the DEEs during communication over the network;
    storing performance metrics of each of the DEEs in a database in response to the monitoring of each of the DEEs;
    defining a set of rules and constraints for the operation of the networked system, the rules and constraints including limitations on adjustments to the parameter setting;
    analyzing the stored performance metrics stored in the database, the analyzing using the defined rules and constraints to determine possible adjustments to the parameter setting of each of the DEEs;
    determining whether the adjustment to one or more parameter settings of one or more of the plurality of DEEs is desired; and
    applying an adjustment to the parameter setting of at least one of the DEEs, the adjustment configured to define an adjusted configuration state for the networked system.

2. The method of claim 1, wherein the applying of the adjustment to the parameter setting of at least one of the DEEs is accomplished by an executable application, the executable application residing in the networked system.

3. The method of claim 2, wherein the executable application receives inputs from one or more of the DEEs.

4. The method of claim 2, wherein the executable application receives inputs from the database.

5. The method of claim 2, wherein the executable application receives inputs from the rules and constraints.

6. The method of claim 1, wherein the applying of the adjustment to the parameter setting of at least one of the DEEs is accomplished in response to an alert, the alert issuing from an application configured to perform the analyzing.

7. The method of claim 1, wherein the applying of the adjustment to the parameter setting of at least one of the DEEs is accomplished automatically by the networked system, the networked system including an application that automatically applies the adjustment to the parameter setting in response to the performance metrics.

8. The method of claim 1, wherein each of the DEEs are self-calibrating.

9. A method of optimizing a configuration of a networked system, comprising:
    monitoring a performance of the networked system, the networked system being a computer system defined by a plurality of data exchange entities (DEEs) and attached to a network, each one of the plurality of DEEs having one or more tunable parameters, the tunable parameters defining data exchange operations of the networked system;
    analyzing performance metrics of each of the DEEs, the performance metrics being obtained from the monitoring of the performance of the networked system;
    storing performance metrics of each of the DEEs in a database;
    defining a set of rules and constraints for the operation of the networked system, the rules and constraints including limitations on an adjustment of tunable parameters; and determining whether the adjustment to one or more tunable parameters of one or more of the plurality of DEEs is desired; and applying an adjustment to one or more tunable parameters of one or more of the plurality of DEEs.

10. The method of claim 9, wherein the applying the adjustment to one or more tunable parameters of one or more of the plurality of DEEs is accomplished by an application, the application configured to receive inputs and to direct adjustment of one or more tunable parameters of one or more of the plurality of DEEs.

11. The method of claim 10, wherein the inputs include performance metrics being obtained from the monitoring of the performance of the networked system.

12. The method of claim 10, wherein the inputs include the rules and constraints.

13. The method of claim 9, wherein the applying of the adjustment to one or more tunable parameters of one or more of the plurality of DEEs is accomplished in response to an alert, the alert issuing from an application configured to perform the analyzing.

14. The method of claim 9, wherein the applying of the adjustment to one or more tunable parameters of one or more of the plurality of DEEs is accomplished automatically by the networked system, the networked system including an application that automatically applies the adjustment to the one or more tunable parameters of on or more of the plurality of DEEs in response to the performance metrics.

15. The method of claim 9, wherein each of the DEEs are self-calibrating.

16. A method for optimizing a configuration state for a computing environment, comprising:

monitoring a performance of the computing environment, the computing environment being defined by a plurality of data exchange entities (DEEs) with each one of the plurality of DEEs having one or more tunable parameters, the one or more tunable parameters defining data exchange operations within the computing environment;

storing performance metrics of each one of the plurality of DEEs to a database;

evaluating the stored performance metrics of each one of the plurality of DEEs, the evaluating including a consideration of rules and constraints for the computing environment, the rules and constraints including limitations on an adjustment of the tunable parameters;

determining whether adjustment to one or more tunable parameters of one or more of the plurality of DEEs is desired; and applying an adjustment to the one or more tunable parameters, the adjustment being applied to define an adjusted configuration state for the computing environment, wherein the computing environment includes means for automatically optimizing the configuration state.

17. The method of claim 16, wherein the means for automatically optimizing the configuration state includes an executable application residing in the computing environment.

18. The method of claim 16, wherein the computing environment is a local computing system attached to a computing network.

* * * * *